Jan. 30, 1968     R. J. SMITH     3,366,428
BEARING ASSEMBLY AND SEAL
Filed Sept. 17, 1965     2 Sheets-Sheet 1
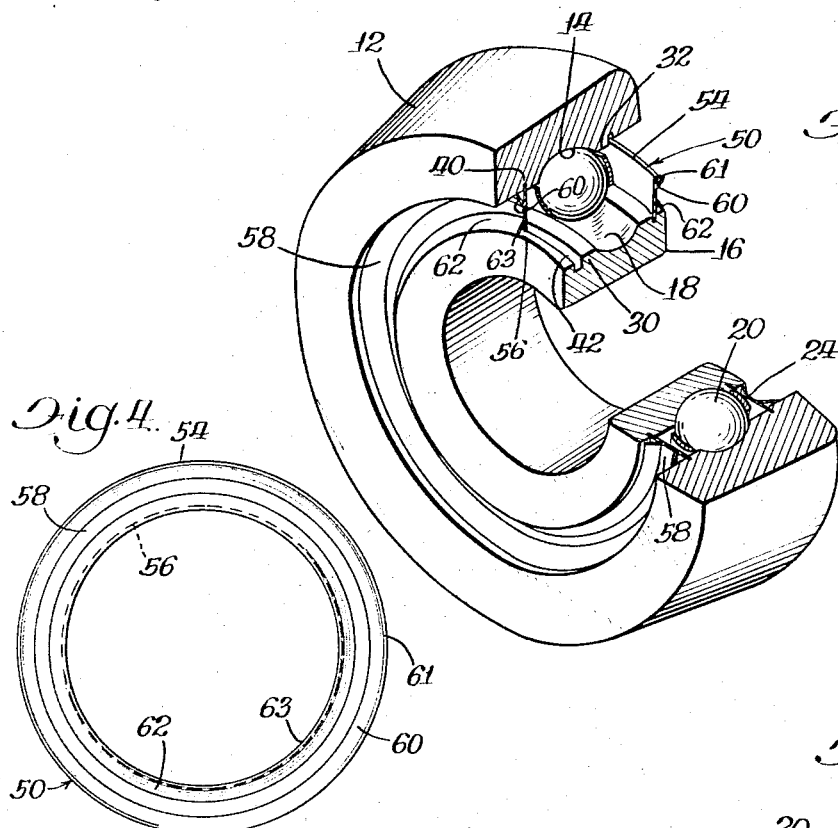
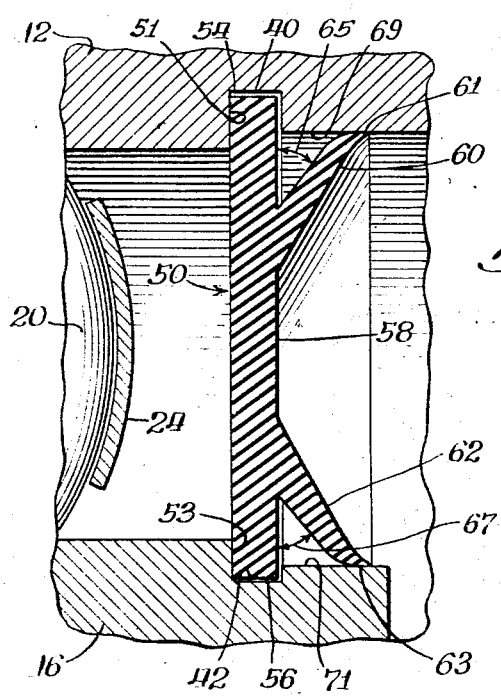
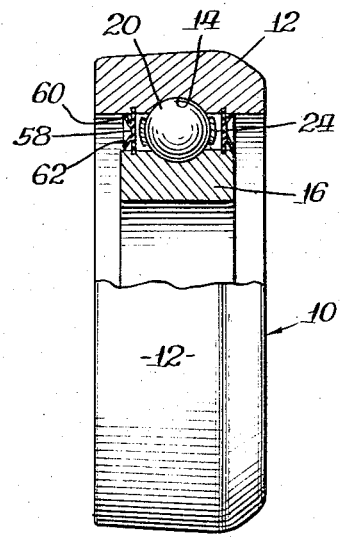
Inventor:
Richard J. Smith
By Mueller, Aichele & Rauner
Attys Jan. 30, 1968   R. J. SMITH   3,366,428
BEARING ASSEMBLY AND SEAL
Filed Sept. 17, 1965   2 Sheets-Sheet 2

Inventor:
Richard J. Smith
By
Mueller, Aichele & Rauner
Attys.

United States Patent Office 3,366,428
Patented Jan. 30, 1968

3,366,428
BEARING ASSEMBLY AND SEAL
Richard J. Smith, Valparaiso, Ind., assignor to McGill Manufacturing Company, Inc., Valparaiso, Ind., a corporation of Indiana
Filed Sept. 17, 1965, Ser. No. 488,194
7 Claims. (Cl. 308—187.2)

ABSTRACT OF THE DISCLOSURE

The inner and outer race rings of a bearing assembly each have oppositely positioned, annular, radially extending grooves therein. An annular sealing ring of synthetic material has a radial face defined by an outer peripheral edge and an inner annular edge. Extending upwardly and inwardly, divergent to the radial face, are integral extensions. The sealing ring is supported between the inner and outer race rings by inserting the outer peripheral edge and the inner annular edge into the oppositely positioned grooves. The inner and outer extensions form an interference fit with the inner and outer race rings. Not only do they form a running contact seal with the race rings but they also apply pressure to the sealing ring to maintain it in a running contact fit with one of the walls of each of the grooves.

---

This invention relates generally to molded seal rings for bearing assemblies, and more particularly to such a seal providing a multiple contact with moving parts in an antifriction bearing assembly, adapted to keep moisture and foreign matter out of the bearing raceway.

In many industrial applications where there is a possibility of only slight contamination getting into the anti-friction bearing elements, a seal having a single element contact with a bearing ring will retain the lubricant within the bearing, and exclude foreign particles such as dirt so that the bearing operates satisfactorily during its normal life. In heavy duty applications, however, where the bearings are constantly being exposed to dirt, moisture, chemicals and the like as in farm implements, single element bearing seals have been found to be unsatisfactory and are usually replaced with a multi-element counterpart.

It has been common in the past to have multi-element seals which were contained in a groove in either the inner or outer race of the bearing with the uncontained ends of the seal elements dragging on the surface of the other race in a running contact seal therewith. The material commonly used for the seal elements made the seals bulky, and required a large amount of space to perform the sealing function, thereby limiting the area of the bearing surface that could be utilized and indirectly limiting the load that could be supported for any given number of hours of bearing life. In addition, tolerances were generally critical between the outer and inner race rings in order to limit seal "drag" on the bearing races to a useful amount. These close tolerances and the need for a better finish to reduce drag necessitates grinding the mating surfaces of the race rings and generally added to production costs.

Many attempts have been made within the bearing industry to use nylon in the sealing elements because of possible space saving and in particular because of the relatively low cost of nylon as compared to other materials currently used for seals. Nylon, however, is pressure sensitive and, if mounted without external support, it will not maintain a tight or pressed fit with an associated steel bearing member. Therefore, after a short period of time in an operating installation, a tightly fitted nylon sealing member which is confined in a groove in one race and permitted to drag on the other race within close tolerances will become loose and allow the entrance of foreign material into the bearing raceway.

It is one object of this invention to provide an improved lubricant seal for an anti-friction bearing assembly that extends bearing life.

It is another object of this invention to utilize the advantages in an anti-friction bearing assembly of synthetic material such as nylon which can be molded into a seal requiring a minimum of space, thereby permitting larger area bearing surfaces to be utilized in a given axial space in a bearing assembly.

It is another object of this invention to provide an improved multiple contact lubricant seal for an anti-friction bearing assembly that is relatively simple and inexpensive to produce, and provides a tight seal in a running contact fit with the bearing rings.

The principal feature of the invention is the provision of a multiple contact molded sealing ring in such a structure that when retained in two corresponding grooves in the inner race ring and outer race ring, pressure is developed between portions of the sealing ring and faces of the race ring portions to such a degree that foreign matter is excluded from the bearing by a resilient running contact fit between the sealing ring and race rings, and to such a degree that positive retention of the sealing ring in the race rings during the life of the sealing ring is accomplished.

Another feature of this invention is the provision of an annular sealing unit for a bearing assembly having an inner race ring and an outer race ring with anti-friction elements therein wherein the sealing unit includes a body portion having a sealing portion extending radially outwardly therefrom and a sealing portion extending radially inwardly therefrom. Each of the sealing portions has a pair of extensions therein which are separated axially from one another at their outer radial end and join one another at their inner radial end. At least one extension of each pair is fitted and maintained in grooves in the inner and outer race rings. The other extension in the pair applies pressure on its corresponding race ring and on the extension received in the groove to maintain a running contact seal with the wall thereof.

A further feature of this invention is the provision of an annular sealing ring having an inner annular edge and an outer peripheral edge with outer and inner integral resilient extensions thereon, and extending therefrom in a direction generally toward the outer and inner edge of the sealing ring. The outer and inner edges of the ring are retained in corresponding seal-retaining grooves in the respective race rings, with the extensions being received in and resiliently compressed by the walls of the grooves into a running contact seal therewith. The compressed extensions react to resiliently press the sealing ring into a running contact seal with the walls of such grooves in the bearing assembly. In this sealing ring the entire structure is retained in the grooves and performs its multiple contact sealing function wholly therein.

Still another feature of this invention is the provision of an annular sealing member having a bifurcated outer peripheral surface and a bifurcated inner annular surface. The bifurcations extend between and lie within the annular grooves in the respective race rings, and are compressed thereby to form a running contact seal with the walls of the grooves.

In the drawings:

FIG. 1 is a perspective view, partly in section, of a bearing assembly and seal structure in accordance with this invention (the bearing is a ball bearing for illustrative purposes, but could be any other anti-friction bearing with two race rings);

FIG. 2 is a fragmentary cross-sectional view of the bearing assembly of FIG. 1;

FIG. 3 is an expanded cross-sectional view of the seal structure in fragmentary portions of the two race rings;

FIG. 4 is a front view of the seal structure of FIG. 1;

Figure 5:
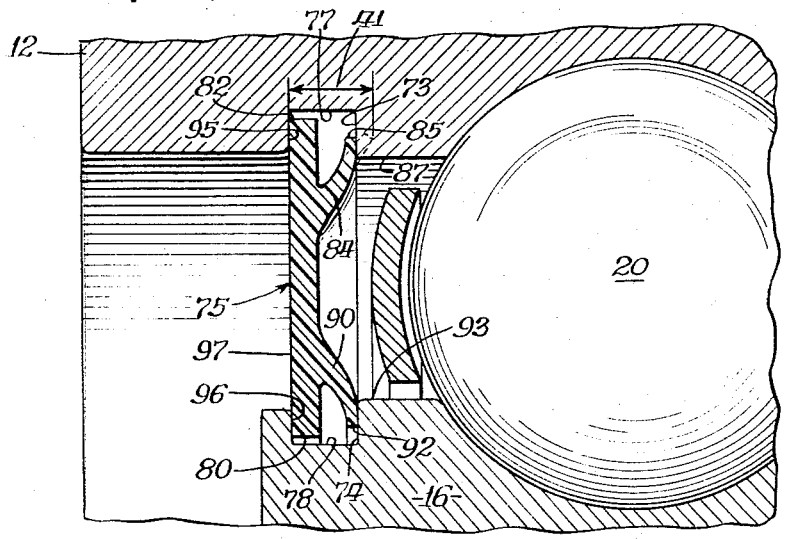
FIG. 5 is an expanded cross-sectional view of a second embodiment of the seal structure.

In accordance with one embodiment of this invention, the anti-friction ball bearing assembly includes an inner race ring and an outer ring forming a raceway for receiving a series of rolling elements. An annular sealing member of a rigid but slightly resilient synthetic material includes a body portion having a sealing portion extending radially outwardly therefrom and a sealing portion extending radially inwardly therefrom. Each of the radially extending sealing portions includes a pair of extensions which are separated axially from one another at their outer radial ends and join one another at their inner radial ends. At least one extension of each pair is fitted and maintained in corresponding grooves in the inner and outer race rings. The other extension in the pair applies pressure on its corresponding race ring and on the extension received in the groove to maintain a running contact seal with the wall thereof.

The annular sealing member could take the form of a sealing ring which constitutes the body of the seal and whose outer peripheral edge and inner annular edge each forms one of the extensions of the outwardly and inwardly radially extending sealing portions. One of a pair of radial extensions integral with the face of the sealing ring extends generally radially outwardly to the outer peripheral edge of the ring and the other radially inwardly toward the inner annular edge of the ring. These extensions are separated at their radial ends from the peripheral and annular edges of the sealing rings and cooperate therewith to form the inwardly and outwardly radially extending sealing portions. The annular sealing member could take still another form with the outwardly and inwardly radially extending sealing portions formed by a sealing ring that has a bifurcated outer peripheral edge and a bifurcated inner annular edge. The bifurcations or extensions are separated at their radial ends from each other to form the pairs of extensions of the sealing portions.

Referring specifically to the drawings, the bearing assembly of FIGS. 1 and 2 is of the ball bearing type, but this invention is not limited to one particular type of bearing and would find equal utility, for instance, with radial roller or spherical roller bearing assemblies.

The bearing assembly 10 includes an outer race ring 12 which has a ball track 14, and an inner race ring 16 which has a ball track 18. The race rings 12 and 16 have a common axis and form a raceway in the bearing tracks 14 and 18 between the respective outer and inner faces thereof. A series of rolling elements 20 are positioned in the raceway by separator 24. An inner lands portion 30 on the inner race ring 16 and a corresponding outer lands portion 32 on the outer race ring 12 restrict the axial movement of the rolling elements 20. The inner diameter of the outer race ring is mated to the outer diameter of the inner race ring. A pair of grooves 40 extend radially into the inner surface of the outer race ring 12 while an oppositely disposed pair of grooves 42 extend radially into the outer peripheral surface of the inner race ring 16. The grooves 40 and 42 are located substantially near the outboard axial ends of the respective race rings. The space between the inner and outer race rings at their axial ends thereof is provided with a sealing structure in the manner hereinafter described. Although the seal will be described for only one outboard axial end of the bearing 10, it should be clear that the description pertains equally to the seal at the opposite axial end, or in those bearings where only one axial end of the structure is sealed.

In accordance with this invention, an annular sealing ring 50 shown in FIGS. 1–4 made from rigid but slightly resilient material, preferably molded from a plastic or synthetic material such as nylon, forms a flexible sealing structure. When the preferred nylon and plastic materials are used, it is known that they tend to cold flow after substantial continued use and conform themselves to the available confining space. In addition, many plastic materials, and particularly nylon, are known to have self-lubricting properties so that close tolerances between the mating surfaces of the race rings are not needed.

The sealing ring 50 has an outer peripheral edge 54 and an inner annular edge 56 that defines the radial face 58 of the ring. Molded integral with the radial face 58, and extending outwardly therefrom are two resilient sealing extensions or lip portions 60 and 62 respectively. The outer extension 60 extends radially outwardly in a direction generally divergent to the sealing ring 50 such as to form an acute angle 65 between the extension 60 and the outboard radial face of the sealing ring 50. The inner extension 62 extends radially inwardly in a direction generally divergent to the sealing ring 50 such as to form an acute angle 67 between the extension 62 and the outboard radial face 58 of the sealing ring 50.

In operation, the ring 50 is positioned within the grooves 40 and 42 with the inner annular edge 56 inserted with a close running fit into the groove 42 in the inner race ring 16 to maintain the ring 54 in position and to resist the axial displacement of ring 50 by foreign material. The outer peripheral edge 54 is received in a close running fit within the groove 40. The diameter of the outer extension 60 at the outer radial end 61 thereof is greater than the diameter of the bore of the outer race 12 at 69. Therefore, when the ring 50 is positioned within the grooves, the extension 60 is resiliently compressed by the outer race 12. Similarly, the diameter of the inner extension 62 at the outer radial end 63 thereof is less than the diameter of the peripheral surface of the inner race 16 at 71 so that the extension 62 is resiliently compressed thereby. This results in the extensions 60 and 62 forming an interference fit with the inner surface of the outer race and the peripheral surface of the inner race respectively. The lip extensions when compressed by the race rings react to resiliently press the ring 50 against the walls 51 and 53 of the grooves 40 and 42 to form a running contact seal therewith.

The sealing action of this invention is provided by the interference fit of the extensions with the races and the running contact seal between the ring 50 and the walls of the grooves. Therefore, any foreign material that could conceivably pass between the extensions and the race units would be blocked from the raceway by the running contact seal between the ring 50 and the walls of the grooves.

Because synthetic materials such as nylon are pressure sensitive, they will cold flow away from the surface with which they have contact. In addition, they exhibit a tendency to pick up moisture resulting in expansion of the material or, if in a warm atmosphere, to lose moisture resulting in contraction of the material. The seal ring 50 of this invention, however, is confined radially in both directions by the grooves 40 and 42. Therefore, if the seal ring 50 expands or contracts it will only enhance the close running fit of the peripheral edge 54 and annular edge 56 of the seal ring with the grooves 40 and 42. Because the effectiveness of the seal ring 50 does not depend on an interference or labyrinth fit between the seal edges and the bottoms of the grooves, but rather on the running contact fit between the seal and the walls 51 and 53 of the respective races, the pressure sensitivity of the nylon does not create any particular problems. The reduced cross-sections of the extensions compared to the ring 50 makes the same thin enough and resilient enough to permit a relatively heavy interference with the inner 16 and outer 12 race rings so that the pressure sensitivity of the nylon can be disregarded and contact will remain between the lip portions and the race rings for the life of the bearing.

FIG. 5 shows a second embodiment of the sealing arrangement. The ring 75 is positioned within the grooves 77 and 78 with the inner annular edge 80 and the outer peripheral edge 82 in a close running fit therewith. The diameter of the outer extension 84 at the outer radial end 85 thereof is greater than the diameter of the bore of the outer race 12 at 87. Likewise, the diameter of the inner extension 90 at the outer radial end 92 thereof is less than the diameter of the peripheral surface of the inner race 16 at 93. Furthermore, the axial dimension or width of the grooves 77 and 78 is less than the axial dimension 41 between the sealing ring 75 and the extensions 84 and 90. For purposes of illustrating the dimension 41, the extension 84 is shown in dotted in the position it would occupy if not confined in the groove 77. In this embodiment, instead of the extensions 84 and 90 making an interference fit with the outer peripheral surfaces of the inner race ring and the bore of the outer race ring, they are confined within the grooves 77 and 78 respectively and resiliently compressed by the walls 73 and 74 into a running contact seal therewith. The resiliently compressed lips then react to bias or pressure the annular sealing ring 75 into a running contact seal with the walls 95 and 96.

The sealing action of this embodiment is very efficient, for instance, if foreign particles could possibly work their way between the walls 95 and 96 and the sealing ring 75 into the grooves 40 and 42, any further movement of the particle in an axial direction would only serve to press the extensions 84 and 90 more firmly against the walls 73 and 74. Furthermore, if the bearing using this seal was to be relubricated while in operation, the seal would lend itself to venting off the internal relubrication pressures built up in the bearing raceway. As the pressure increased, the extensions 84 and 90 would move away from the walls 73 and 74 thereby permitting the lubricant to pass into the grooves 77 and 78. If passages existed between the seal ring 75 and the walls 95 and 96 formed, for instance, by indentations in the radial face 97 of the sealing ring 75, the lubricant could be bled from the raceway, around the outer radial ends 85 and 92 of the ring 75, and to the atmosphere through these passages thereby relieving the internal relubricating pressures.

Figure 6:
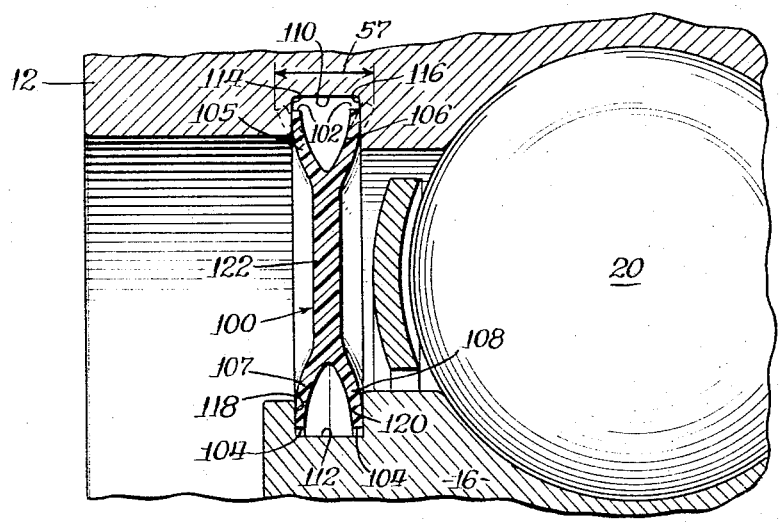
FIG. 6 is an expanded cross-sectional view of a third embodiment of the seal structure.

FIG. 6 illustrates a third embodiment of the invention. In this embodiment the sealing ring 100 has a bifurcated outer periphery 102 and a bifurcated inner annular edge 104. The axial dimension 57 between the bifurcations or extensions 105, 106 and 107, 108 is greater than the width or axial dimension of the grooves 110 and 112. For purposes of illustrating the dimension 57, the bifurcations 105 and 106 are shown dotted in the position they would have occupied if not defined in the groove 110.

The sealing ring 100 is inserted between the race rings 12 and 16 by resiliently compressing the bifurcations 105, 106 and 107, 108 between the walls 114, 116 and 118, 120 respectively of the grooves 110 and 112. The reduced cross-section of the bifurcations as compared to the body 122 of the seal make the same thin enough and resilient enough to permit a relatively heavy running contact seal between the bifurcations and the walls of the grooves.

Figure 7:
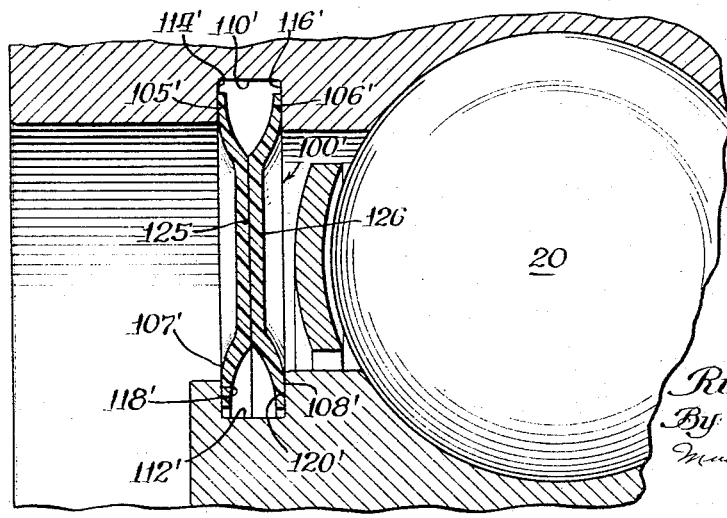
FIG. 7 is an expanded cross-sectional view of a modified version of the embodiment of the seal structure shown in FIG. 5.

FIG. 7 illustrates a seal which is identical to the seal illustrated in FIG. 6 with the exception that the seal in FIG. 7 is in two conjugate half sections 125 and 126. By making the seal in two sections, a single acting mold may be used for molding each half. The single piece seal shown in FIG. 6 however, requires a double acting mold to make the same which adds a substantial amount to the cost of manufacturing the seal. In installing the seal the first member 125, for instance, is set into the grooves 110' and 112', and the second member 126 is then snapped into the grooves. In this position the conjugate sections 125 and 126 are mated, and the extensions 105', 106' and 107', 108' thereof are resiliently compressed by the walls of the grooves 110' and 112' into a running contact seal therewith.

One bearing constructed in accordance with the principal embodiment of this invention (FIGS. 1 to 4 inclusive) included the following dimensions and these are lised herein merely by way of an illustrative example, which, of course, is not intended to limit the invention in any manner.

| | Inches |
|---|---|
| Groove 40 | |
| Radial dimension | [1] 2.750 |
| Axial dimension | .045 |
| Groove 42 | |
| Radial dimension | 2.000 |
| Axial dimension | .043 |
| Bore 69 of the outer race ring 12 on which extension 60 rides | [1] 2.660 |
| Outer peripheral surface 71 of the inner race ring 16 on which extension 62 rides | [1] 2.040 |
| Bore of the outer race ring 12 at wall 51 of groove 40 | [1] 2.630 |
| Outer peripheral surface of the inner race ring 16 at wall 53 of groove 42 | [1] 2.100 |
| Seal 50 | |
| Outer diameter | [1] 2.720 |
| Bore | [1] 2.010 |
| Axial dimension | .031 |
| Dimension of the outer radial end 61 of outer extension 60 | [1] 2.674 |
| Dimension of the outer radial end 63 of inner extension 62 | [1] 2.026 |

[1] In diameter.

Because of the nature of the sealing action, the radial tolerances between the mating surfaces of the inner and outer race rings and the finish thereof is not critical and need only to be turned by machine rather than turned and ground, as would be necessary if the finish and radial tolerances were critical. In addition, the sealing ring 50 and the integral extensions 60 and 62, and the ring 100 with the bifurcated periphery and inner annular edge, each form a relatively flat and compact package and utilize a minimum of space to perform the sealing function so that larger area bearing surfaces may be utilized in a given axial space.

What has been described, therefore, is a relatively simple and inexpensive multiple contact seal that insures normal bearing life for heavy duty applications of bearing assemblies subjected to a high degree of contamination.

I claim:

1. In a bearing assembly having an inner member and an outer member which are relatively rotatable and which are spaced apart for receiving anti-friction elements and lubricant therebetween, a means for sealing such space to prevent the introduction of foreign matter therein, including in combination, an annular radially extending groove in each said member oppositely disposed from one another in said inner member and said outer member, and each having two radial walls defining said groove for the full depth thereof, annular sealing ring means comprising a central annular body portion with an annular outer sealing portion extending radially outwardly therefrom towards the outer member and an annular inner sealing portion extending radially inwardly from said central body portion towards the inner member, with each said inner and outer sealing portions comprising a pair of extensions with at least one extension in each pair in said grooves of said first and second members respectively in running engagement with the wall thereof, and with the other extension in each pair applying pressure on the corresponding member thereof and providing pressure on said one extension in its running engagement with the wall of the groove.

2. The bearing assembly of claim 1 wherein said sealing ring means includes an annular sealing ring having an annular face forming said body portion, said ring having an outer peripheral edge and an inner annular edge and inner and outer extensions integral therewith, said outer peripheral edge and said outer extension forming said outer sealing portion and said inner annular edge and said inner extension forming said inner sealing portion, and both said outer peripheral edge and said outer extension and said inner peripheral edge and said inner extension being confined within said grooves, so that both said inner and outer extensions are resiliently compressed by one wall of said first and second grooves respectively to form a running contact seal therewith, and both said extensions apply pressure to said sealing ring to maintain the same in a running contact fit with the wall opposite the one wall of the first and second grooves.

3. The bearing assembly of claim 1 wherein said outer and inner sealing portions are respectively a bifurcated outer peripheral edge of said body portion having first and second extensions extending radially outwardly towards the outer member, and a bifurcated inner annular edge having first and second extensions extending radially inwardly toward the inner member, said sealing means being maintained in the outer and inner members by said outer extensions extending into and being resiliently compressed by said walls of said first groove to form a running contact fit therewith, and by said inner extensions extending into and being resiliently compressed by said walls of said second groove to form a running contact fit therewith, said inner and outer extensions cooperating to form a multiple contact seal.

4. The bearing assembly of claim 1 wherein said sealing ring means includes first and second conjugate annular sealing members, each said sealing member having a substantially flat body portion, each said body portion having a first extension extending radially outwardly therefrom and a second extension extending radially inwardly therefrom, said ring means being maintained in the inner and outer relatively rotatable members by said body portions of said conjugate sealing members being mated and having said outer extensions extending into and being resiliently compressed by said walls of said first groove to form a running contact fit therewith, and by said inner extensions extending into and being resiliently compressed by said walls of said second groove to form a running contact fit therewith, said first and second sealing members and said inner and outer extensions thereof cooperating to form a multi-contact seal.

5. In a bearing assembly, the sealing structure for sealing the lubricant carrying portion of the bearing assembly against introduction of foreign matter into the same, the bearing assembly including inner and outer race rings and first and second radially extending annular grooves oppositely disposed from one another in the inner and outer race rings respectively, each of the grooves having two radial walls defining the groove for the full depth thereof, and wherein the sealing structure comprises a moulded annular sealing ring of synthetic material having an outer peripheral edge and an inner annular edge with a radial face between the same and defined thereby and having outer and inner extensions integral therewith, said sealing ring being maintained in the outer and inner race rings by said outer peripheral edge and said inner annular edge extending into the first and second grooves respectively, said outer extension extending radially outwardly from said radial face in a direction divergent of said ring, said inner extension extending radially inwardly from said radial face in a direction divergent of said ring, with said annular sealing ring and said inner and outer extensions adapted to engage under pressure a part of the bearing assembly in a running contact fit therewith to provide a multicontact seal at the places of engagement against introduction of foreign matter.

6. The bearing assembly of claim 5 wherein said outer extension extends into the first annular groove and is resiliently compressed by one wall thereof to form a running contact seal therewith, and said inner extension extends into said second annular groove and is resiliently compressed by one wall thereof to form a running contact seal therewith, so that both said extensions apply pressure to said sealing ring to maintain the same in a running contact fit with the wall opposite the one wall of said first and second grooves.

7. In a bearing assembly having an inner member and an outer member which are relatively rotatable and which are spaced apart for receiving anti-friction elements and lubricant therebetween, a means for sealing such space to prevent the introduction of foreign matter therein, including in combination, an annular radially extending groove in each said member oppositely disposed from one another in said inner member and said outer member, and each having two radial walls defining said groove for the full depth thereof, an annular sealing ring of synthetic material having an outer peripheral edge and an inner annular edge with a radial face between the same and defined thereby, and having outer and inner extensions integral therewith, said outer extension extending radially outwardly from said radial face in a direction divergent to said ring, said inner extension extending radially inwardly from said radial face in a direction divergent to said ring, said annular sealing ring being maintained in the inner and outer members by said outer peripheral edge and said inner annular edge extending into said grooves, and said inner and outer extensions being in an interference fit with said inner and outer rotating members respectively to form a running contact seal therewith and applying pressure to said sealing ring to maintain the same in a running contact fit with one of said walls of each said grooves, said sealing ring and said extensions cooperating to form a multiple contact seal.

References Cited
UNITED STATES PATENTS

| | | | |
|---|---|---|---|
| 1,722,488 | 7/1929 | Bott et al. | 308—187.2 |
| 2,173,247 | 9/1939 | Bott | 308—187.2 X |
| 2,276,225 | 3/1942 | Carter | 277—188 |
| 2,626,839 | 1/1953 | Creson et al. | 308—36.1 |
| 2,914,365 | 11/1959 | Spicacci | 308—187.2 |
| 3,068,051 | 12/1962 | Koch | 308—187.1 |

MARTIN P. SCHWADRON, *Primary Examiner.*

ROBERT A. DUA, *Examiner.*